S. MOORE.
Heel-Stiffeners for Boots and Shoes.
No. 144,556.  Patented Nov. 11, 1873.
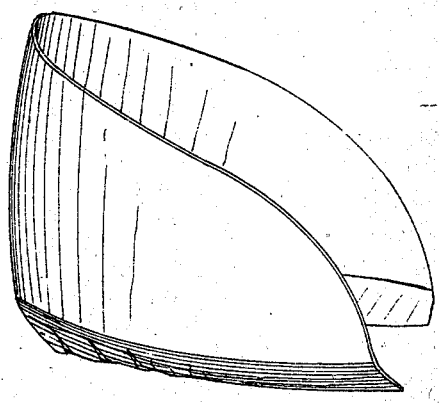
Witnesses.
M. W. Frothingham.
L. H. Latimer.
Inventor.
Stephen Moore.
By his Attys.
Crosby & Gould

UNITED STATES PATENT OFFICE.

STEPHEN MOORE, OF SUDBURY, MASSACHUSETTS, ASSIGNOR TO HIMSELF AND HOMER ROGERS, OF SAME PLACE.

IMPROVEMENT IN HEEL-STIFFENERS FOR BOOTS AND SHOES.

Specification forming part of Letters Patent No. 144,556, dated November 11, 1873; application filed October 23, 1873.

*To all whom it may concern:*

Be it known that I, STEPHEN MOORE, of Sudbury, in the county of Middlesex and State of Massachusetts, have invented an Improvement in the Manufacture of Heel-Stiffeners; and I do hereby declare that the following, taken in connection with the drawings which accompany and form part of this specification, is a description of my invention sufficient to enable those skilled in the art to practice it.

In the manufacture of heel-stiffeners or counters, it is now customary to use for stock, in their manufacture, leather-board, cutting the stock to shape, and then forming and crimping it by suitable molding and bending mechanism. Heel-stiffeners thus made answer their purpose well, but are more or less liable to become impaired by contact of moisture penetrating through the boot. To obviate this, I subject the stiffener, after having formed it to shape, to an enameling process, by which the outer surface (or both outer and inner surfaces) is so coated as not only to be impervious to moisture, but to be more enduring than if finished, as heretofore, by pressure alone. My invention consists in a heel-stiffener, which, being made of leather-board or similar material, shaped by pressure suitably applied, is finished by being outer-coated, or both outer and inner coated, by a water-proof enamel. Without color, a drawing will hardly serve to illustrate my invention, and I merely refer to the accompanying drawing to show the form of the stiffener to which my invention is applied. Said stiffener is made from a sheet first cut in flat form to the required shape for the action of the pressing and bending mechanism, and then shaped by mechanism, such, for instance, as is shown in United States Letters Patent No. 132,849, dated November 5, 1872, granted on the invention of Homer Rogers and myself, the main part being curved laterally, and the edge being crimped, as seen in the drawing. The stiffener being then dried, is coated with any suitable enameling composition, such as is used in making enameled leather, this coating being preferably applied only on the outer surface, and the coating or varnish having been suitably dried, the stiffener is finished ready for use.

I claim—

A heel-stiffener formed of leather-board, or similar material, coated, substantially as described.

Executed this 26th day of September, A.D. 1873.

STEPHEN MOORE.

Witnesses:
FRANCIS GOULD,
M. W. FROTHINGHAM.